Patented Jan. 10, 1939

2,143,014

UNITED STATES PATENT OFFICE 2,143,014

PRODUCTION OF OLEFINES FROM GASEOUS HYDROCARBONS

Hans Klein, Mannheim, Germany, assignor to I. G. Farbenindustrie Aktiengesellschaft, Frankfort-on-the-Main, Germany No Drawing. Application July 9, 1935, Serial No. 30,575. In Germany July 11, 1934

3 Claims. (Cl. 260—170)

The present invention relates to the production of olefines from gaseous hydrocarbons.

The conversion of saturated gaseous hydrocarbons, in particular those containing more than one carbon atom in the molecule, into olefines, as for example of propane into propylene and ethylene, is a strongly endothermic reaction. When carrying out the reaction, especially in large reaction chambers, there are therefore, difficulties as regards heat, because the heat conductivity of the most suitable wall materials (glass, quartz or ceramic masses) is not sufficient for a satisfactory throughput. It has therefore previously been proposed to carry out the reaction in Cowper apparatus in which heating periods alternate with reaction periods in regular sequence. Working in this manner has the drawback that it is discontinuous.

I have now found that the said drawback is avoided by exposing the hydrocarbons, or gases containing the same, together with at least 10 per cent by volume (with reference to the hydrocarbons) of oxygen but less than is sufficient for the complete conversion of the hydrocarbons into oxides of carbon and steam, to elevated temperatures at subatmospheric pressure. It is preferable to add to the hydrocarbons from 10 to 45 per cent by volume of oxygen with reference to the hydrocarbons. Depending on the amount of added oxygen, it is possible to counteract the heat consumption of the formation of olefines wholly or partly by the exothermic reaction with oxygen. The oxygen content in relation to the pressure in the reaction chamber should be such that the gas mixture remains with certainty outside the explosion limits. When carrying out the reaction on a large scale it is preferable to reduce the pressure to such an extent that the gas mixture entering the reaction chamber is not explosive even if the oxygen content fluctuates. The reduced pressure employed may be varied within wide limits and may amount for example to from 0.05 to 0.5 atmosphere.

The temperatures maintained in the conversion according to the present invention usually range between 500° and 1000° C. and preferably between 750° and 950° C. Under otherwise the same conditions the temperatures at which the conversion of hydrocarbons having a lower number of carbon atoms in the molecule takes place at a certain speed of reaction are somewhat higher than the temperatures at which the conversion of higher molecular hydrocarbons proceeds with the same speed.

The saturated gaseous hydrocarbons may be employed in the pure state or in admixture with each other or with other gases, such as nitrogen or hydrogen. Similarly vapors, as for example water vapor, may also be added. Instead of pure oxygen, gases containing oxygen or supplying the same under the reaction conditions, as for example $NO_2$, may be employed. These gases consisting of or containing oxygen or supplying the same under the reaction conditions are hereinafter collectively referred to as gases comprising essentially free oxygen. The smaller the oxygen content of these gases, however, the greater must be the output efficiency of the vacuum pump; too great a dilution of the oxygen is therefore undesirable.

Generally speaking, catalysts are not employed. In order better to equalize the temperature, however, the reaction chamber may be provided with fillers. When suitable materials are selected for the walls and the filler, deposition of carbon in the reaction zone only takes place in such small amounts that the apparatus can be operated for months without trouble.

The process may be carried out for example as follows:

The reaction chamber, which is preferably tubular and provided with a heating and cooling jacket, is connected on one side to a vacuum pump which constantly maintains the desired reduced pressure. On the other side is the inlet for the gases to be treated; this is preferably provided with a throttle valve capable of fine adjustment. Before commencing operation, the reaction chamber is brought to the necessary temperature and the vacuum pump set in operation. The mixture of hydrocarbon and oxygen is then allowed to flow in and the temperature is regulated, if necessary with the aid of the cooling jacket. A final gas having a high content of olefines is obtained on the pressure side of the vacuum pump.

No ignition at any part of the reaction space and no formation of a flame is produced in the operation according to the present invention but the conversion of the initial hydrocarbons with the added oxygen takes place uniformly in the entire reaction space or in a large part thereof under the subatmospheric pressures employed.

The following examples will further illustrate the nature of this invention but the invention is not restricted to these examples.

*Example 1*

A mixture of 30.6 volumes of butane and 8 volumes of oxygen is led at 920° C. under a pressure of 230 millimeters (mercury gauge) through a clay tube filled with pieces of quartz. The hourly throughput per volume of reaction chamber is 1100 volumes of the said gas mixture calculated at room temperature and 1 atmosphere pressure. The gas mixture leaving the reaction chamber increases in volume to 2450 volumes and contains 44.2 per cent by volume of olefines. The butane employed is derived from waste gases from the destructive hydrogenation of coal and has an olefine content of 0.6 per cent.

Example 2

A mixture of 30 volumes of butane and 12 volumes of oxygen is led at 920° C. under a pressure of 200 millimeters (mercury gauge) through the apparatus described in Example 1, the throughput being 1400 volumes per volume of reaction chamber per hour. 2660 volumes per hour of a gas having an olefine content of 49.1 per cent are obtained.

Example 3

Industrial propane having an olefine content of 6.8 per cent is mixed in the proportions of 14.1:4 with oxygen and treated at 860° C. under a pressure of 200 millimeters (mercury gauge) in the apparatus described in Example 1. With an hourly throughput of 1400 volumes per volume of reaction chamber, 156 volumes of gas containing 40.4 per cent of olefines are obtained from each 100 volumes of initial gas.

Ethane may also be treated with a result similar to that obtained in the case of propane.

What I claim is:

1. A process for the production of olefines from saturated gaseous hydrocarbons containing more than one carbon atom in the molecule which comprises heating such hydrocarbon to a temperature between 750° and 950° C. under a subatmospheric pressure together with a gas comprising essentially free oxygen employed in such an amount that at least 10 per cent by volume, with reference to the said hydrocarbon, of free oxygen are present, but less than is sufficient for the complete conversion of the said hydrocarbon and while avoiding ignition and flame formation in any part of the reaction space.

2. In the process as claimed in claim 1 adding a gas comprising essentially free oxygen in such an amount that between 10 and 45 per cent by volume, with reference to the initial hydrocarbon, of free oxygen are present.

3. In the process as claimed in claim 1 operating under a pressure ranging between 0.05 and 0.5 atmosphere.

HANS KLEIN.